United States Patent
Shimada et al.

(10) Patent No.: US 11,614,064 B2
(45) Date of Patent: Mar. 28, 2023

(54) INTERNAL-COMBUSTION-ENGINE CONTROL DEVICE AND INTERNAL-COMBUSTION-ENGINE CONTROL METHOD

(71) Applicant: Hitachi Automotive Systems, Ltd., Hitachinaka (JP)

(72) Inventors: Atsushi Shimada, Tokyo (JP); Toshihiro Aono, Tokyo (JP); Masayuki Saruwatari, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/765,727

(22) PCT Filed: Dec. 11, 2018

(86) PCT No.: PCT/JP2018/045403
§ 371 (c)(1),
(2) Date: May 20, 2020

(87) PCT Pub. No.: WO2019/138759
PCT Pub. Date: Jul. 18, 2019

(65) Prior Publication Data
US 2020/0291914 A1    Sep. 17, 2020

(30) Foreign Application Priority Data
Jan. 9, 2018    (JP) .............................. JP2018-001304

(51) Int. Cl.
*F02P 5/00*     (2006.01)
*F02P 5/06*     (2006.01)
(Continued)

(52) U.S. Cl.
CPC ................ *F02P 5/06* (2013.01); *F02D 37/02* (2013.01); *F02D 41/0002* (2013.01);
(Continued)

(58) Field of Classification Search
CPC ......... F02D 2041/001; F02D 2200/101; F02D 2200/024; F02D 37/02; F02D 41/0002;
(Continued)

(56) References Cited

U.S. PATENT DOCUMENTS 7,255,089 B2 *   8/2007   Etou ..................... F02D 35/027
                                                 123/406.29
8,014,935 B2 *   9/2011   Moriya ................... F02D 35/02
                                                 701/114
(Continued)

FOREIGN PATENT DOCUMENTS

JP              7-42607 A      2/1995
JP         2002-357154 A      12/2002
(Continued)

OTHER PUBLICATIONS

International Search Report (PCT/ISA/210) issued in PCT Application No. PCT/JP2018/045403 dated Mar. 26, 2019 with English translation (four (4) pages).
(Continued)

*Primary Examiner* — Gonzalo Laguarda
(74) *Attorney, Agent, or Firm* — Crowell & Moring LLP

(57) ABSTRACT

Provided is a control device and a control method of a high-efficiency internal combustion engine capable of stabilizing combustion and suppressing $NO_x$ emissions without unnecessarily increasing a mounting load on an ECU. Therefore, the control device of the internal combustion engine for controlling the internal combustion engine includes an ignition plug that ignites an air-fuel mixture of fuel and air in the combustion chamber, a combustion pressure estimation sensor that detects a combustion pressure in the combustion chamber, and a crank angle sensor that detects a crank angle of a crankshaft. An MBT region is set based on an ignition delay period from an ignition timing of the ignition plug calculated from a detection value of the combustion pressure (Continued)

estimation sensor and a detection value of the crank angle sensor to a combustion start timing in the combustion chamber, and a combustion period from the combustion start timing to a set amount combustion end timing when a set amount of combustion ends. An ignition timing of the ignition plug is controlled so as to fall within the set MBT region.

10 Claims, 9 Drawing Sheets

(51) Int. Cl.
    *F02M 26/13* (2016.01)
    *F02D 41/00* (2006.01)
    *F02D 41/32* (2006.01)
    *F02M 35/10* (2006.01)
    *F02M 61/14* (2006.01)
    *F02D 37/02* (2006.01)
    *F02P 5/153* (2006.01)

(52) U.S. Cl.
    CPC .......... *F02D 41/009* (2013.01); *F02D 41/32* (2013.01); *F02M 26/13* (2016.02); *F02M 35/10222* (2013.01); *F02M 61/145* (2013.01); *F02D 2200/024* (2013.01); *F02P 5/153* (2013.01)

(58) Field of Classification Search
    CPC .......... F02D 41/009; F02D 41/32; F02P 5/06; F02M 26/13; F02M 35/10222; F02M 61/145
    See application file for complete search history.

(56) References Cited

U.S. PATENT DOCUMENTS

| | | | |
|---|---|---|---|
| 10,533,512 B2* | 1/2020 | Oohata | ................. F02D 41/009 |
| 2003/0121499 A1* | 7/2003 | Daniels | ................. F02P 5/153 |
| | | | 123/406.43 |
| 2016/0290307 A1 | 10/2016 | Urano et al. | |
| 2021/0033042 A1* | 2/2021 | Hitomi | ............... F02D 41/3041 |

FOREIGN PATENT DOCUMENTS

| | | |
|---|---|---|
| JP | 2004-332653 A | 11/2004 |
| JP | 2010-001795 A | 1/2010 |
| JP | 2010-203274 A | 9/2010 |
| JP | 2011-21552 A | 2/2011 |
| JP | 2012-172616 A | 9/2012 |
| JP | 2013-147977 A | 8/2013 |
| JP | 2014-9666 A | 1/2014 |
| JP | 2015-98799 A | 5/2015 |
| JP | 2015-147430 A | 8/2015 |
| JP | 2016-98772 A | 5/2016 |
| JP | 2017-180249 A | 10/2017 |

OTHER PUBLICATIONS

Japanese-language Written Opinion (PCT/ISA/237) issued in PCT Application No. PCT/JP2018/045403 dated Mar. 26, 2019 (five (5) pages).
Japanese-language Office Action issued in Japanese Application No. 2018-001304 dated Mar. 23, 2021 with English translation (eight (8) pages).

\* cited by examiner

FIG. 6

| | CURRENT EXCESS AIR RATIO > TARGET EXCESS AIR RATIO | CURRENT EXCESS AIR RATIO < TARGET EXCESS AIR RATIO |
|---|---|---|
| CURRENT IGNITION TIMING > MBT (CURRENT IGNITION TIMING IS DELAYED FROM MBT) | A: EXCESS AIR RATIO IS DECREASED → IGNITION TIMING IS ADVANCED | C: IGNITION TIMING IS ADVANCED → EXCESS AIR RATIO IS INCREASED |
| CURRENT IGNITION TIMING < MBT (CURRENT IGNITION TIMING IS ADVANCED FROM MBT) | B: IGNITION TIMING IS ADVANCED → EXCESS AIR RATIO IS DECREASED | D: IGNITION TIMING IS DELAYED → EXCESS AIR RATIO IS INCREASED |

FIG. 7

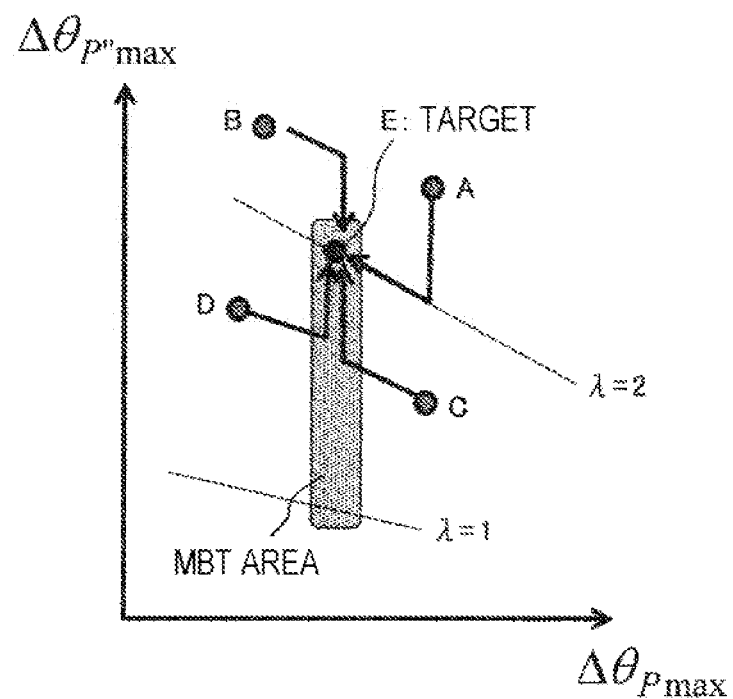

FIG. 12

|  | CURRENT EGR > TARGET EGR | CURRENT EGR < TARGET EGR |
|---|---|---|
| CURRENT IGNITION TIMING > MBT (CURRENT IGNITION TIMING IS DELAYED FROM MBT) | A: EGR RATE IS DECREASED → IGNITION TIMING IS ADVANCED | C: IGNITION TIMING IS ADVANCED → EGR RATE IS INCREASED |
| CURRENT IGNITION TIMING < MBT (CURRENT IGNITION TIMING IS ADVANCED FROM MBT) | B: IGNITION TIMING IS DELAYED → EGR RATE IS DECREASED | D: IGNITION TIMING IS DELAYED → EGR RATE IS INCREASED |

FIG. 13

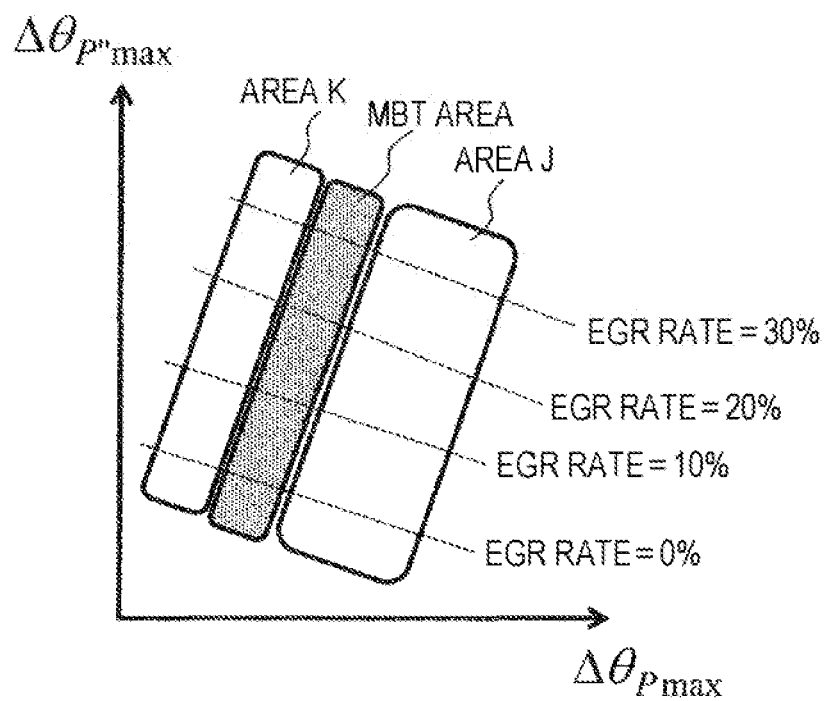

INTERNAL-COMBUSTION-ENGINE CONTROL DEVICE AND INTERNAL-COMBUSTION-ENGINE CONTROL METHOD

TECHNICAL FIELD

The present invention relates to control of an engine system for a vehicle, and more particularly to a technique effective for improving the efficiency of an engine system.

BACKGROUND ART

In order to respond to the introduction of $CO_2$ regulations and RDE regulations (Real Driving Emission) for automobiles, high efficiency of engines is required. A spark ignition engine widely used in automobiles has a problem that its efficiency is lower than that of a compression ignition engine because a low load pumping loss and a need to burn an air-fuel mixture at a theoretical mixture ratio are required.

Lean combustion with air or inert gas in a spark ignition engine is a means for increasing the specific heat ratio of an air-fuel mixture, improving theoretical thermal efficiency, and reducing pumping loss at low loads. Therefore, a significant improve in thermal efficiency can be realized. In particular, in super-lean combustion with an excess air ratio higher than 2, a combustion temperature becomes equal to or less than a minimum temperature at which NO is emitted. Therefore, high thermal efficiency and low exhaust can be realized simultaneously.

However, the super-lean combustion has a problem that the combustion becomes unstable when the excess air ratio becomes larger than a predetermined value, and $NO_x$ is discharged when the excess air ratio becomes smaller than a predetermined value. For this reason, it is necessary to control the excess air ratio with high accuracy and perform stable combustion in order to simultaneously prevent misfire and reduce $NO_x$.

As a background art in this technical field, for example, there is a technique as described in PTL 1. PTL 1 discloses "a control device of an internal combustion engine which includes a crank angle detection unit for detecting a crank angle, a combustion mass ratio calculation unit for calculating a combustion mass ratio, a first crank angle acquisition unit for acquiring a first crank angle at which the combustion mass ratio becomes a predetermined combustion mass ratio, and a feedback control unit for correcting a fuel injection amount such that a calculation value of a crank angle period from an ignition timing to the first crank angle approaches a target value of the crank angle period".

CITATION LIST

Patent Literature

PTL 1: JP 2016-98772 A

SUMMARY OF INVENTION

Technical Problem

PTL 1 described above calculates a heat release rate accompanying combustion by measuring a combustion pressure and a crank angle of an engine, integrates the calculated heat release rate, and detects CA10, which is a timing at which 10% of the fuel is burned, to suppress misfire of lean combustion. In this method, the occurrence of misfire can be suppressed, but it is difficult to respond to the occurrence of $NO_x$.

Also, since it is necessary to calculate the heat release rate from the combustion pressure, the mounting load on the ECU (Engine Control Unit) becomes high, and the influence of the measurement error of the absolute value of the combustion pressure increases. There is a problem in feasibility.

Accordingly, an object of the invention is to provide a control device and a control method of a high-efficiency internal combustion engine capable of stabilizing combustion and suppressing $NO_x$ emissions without unnecessarily increasing a mounting load on an ECU.

Solution to Problem

In order to solve the above problems, the invention provides a control device of an internal combustion engine for controlling the internal combustion engine which includes an ignition plug that ignites an air-fuel mixture of fuel and air in the combustion chamber, a combustion pressure estimation sensor that detects a combustion pressure in the combustion chamber, and a crank angle sensor that detects a crank angle of a crankshaft. An MBT region is set based on an ignition delay period from an ignition timing of the ignition plug calculated from a detection value of the combustion pressure estimation sensor and a detection value of the crank angle sensor to a combustion start timing in the combustion chamber, and a combustion period from the combustion start timing to a set amount combustion end timing when a set amount of combustion ends. An ignition timing of the ignition plug is controlled so as to fall within the set MBT region.

Further, the invention provides a control method of an internal combustion engine which includes (a) measuring a rotation number of a crankshaft in the internal combustion engine, and estimating a torque of the internal combustion engine from any of an intake air amount, a fuel amount, a thermal efficiency, and an accelerator opening, (b) measuring a combustion pressure in a combustion chamber of the internal combustion engine, and calculating an ignition delay period from an ignition timing of an ignition plug to a combustion start timing, and a combustion period from the combustion start timing to a set amount combustion end timing which a set amount of combustion ends, based on the measured combustion pressure in the combustion chamber and the rotation speed of the crankshaft measured in the step (a), and (c) setting an MBT region based on the ignition delay period and the combustion period calculated in the step (b). The ignition timing of the ignition plug is controlled so as to fall within the MBT region set in the step (c).

Advantageous Effects of Invention

According to the invention, it is possible to stabilize combustion and suppress $NO_x$ emissions without unnecessarily increasing the mounting load on the ECU, and realize a control device of a highly efficient internal combustion engine and a control method for the internal combustion engine.

Objects, configurations, and effects besides the above description will be apparent through the explanation on the following embodiments.

BRIEF DESCRIPTION OF DRAWINGS

FIG. 6 is a diagram conceptually illustrating a control method for an internal combustion engine (engine) according to an embodiment of the invention.

FIG. 7 is a diagram conceptually illustrating a control method of an internal combustion engine (engine) according to an embodiment of the invention.

FIG. 12 is a diagram conceptually illustrating a control method of an internal combustion engine (engine) according to an embodiment of the invention.

FIG. 13 is a diagram conceptually illustrating an MBT control method according to an embodiment of the invention.

DESCRIPTION OF EMBODIMENTS

Figure 1:
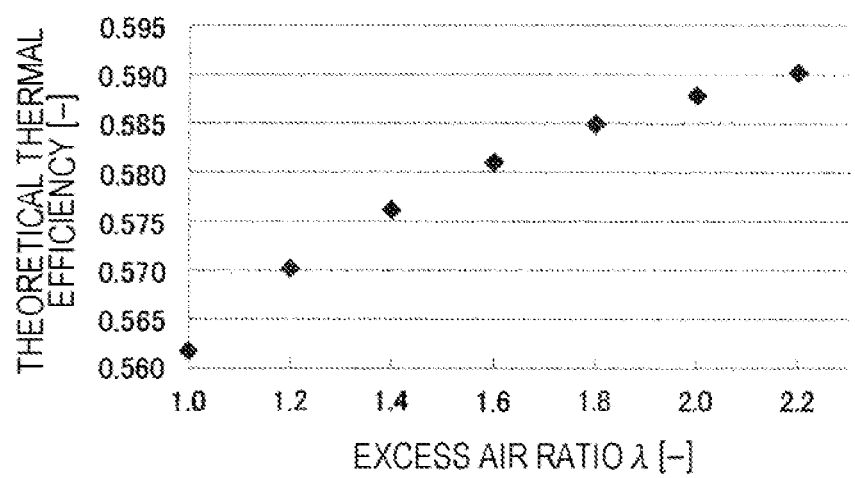
FIG. 1 is a diagram illustrating a relation between an excess air ratio and a theoretical thermal efficiency.

Hereinafter, embodiments of the invention will be described using the drawings. In the drawings, the same components are denoted by the same reference numerals, and detailed description of overlapping portions will be omitted.

First Embodiment

Figure 2:
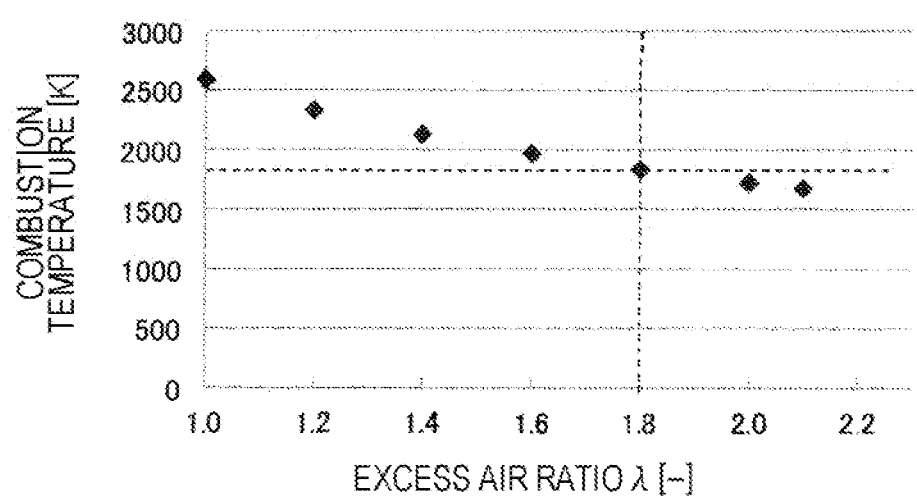
FIG. 2 is a view illustrating a relation between an excess air ratio and a combustion temperature.

First, characteristics of a lean-burn internal combustion engine (lean burn engine) will be described with reference to FIGS. 1 and 2. FIGS. 1 and 2 illustrate theoretical values of the thermal efficiency and the combustion temperature with respect to an excess air ratio (hereinafter, also referred to as "$\lambda$") when the Otto cycle is set as a theoretical cycle.

As illustrated in FIGS. 1 and 2, in the lean burn engine, as the excess air ratio $\lambda$ increases, the specific heat ratio of the working fluid (air-fuel mixture) increases, thereby improving the theoretical thermal efficiency and increasing, and the combustion temperature drops. Normally, when the combustion temperature is 1800 K or lower, $NO_x$ is theoretically not emitted. Therefore, it is understood that, when the excess air ratio $\lambda$ is 1.8 or higher, both high thermal efficiency and low $NO_x$ are compatible.

On the other hand, as the excess air ratio $\lambda$ increases, the laminar combustion velocity decreases, and there is a limit to increasing the excess air ratio $\lambda$. For this reason, it is necessary to perform lean combustion in an area with a small excess air ratio $\lambda$. That is, in order to realize stable combustion and low $NO_x$ lean combustion, it is necessary to accurately control the excess air ratio $\lambda$ in a limited narrow area.

Figure 3:
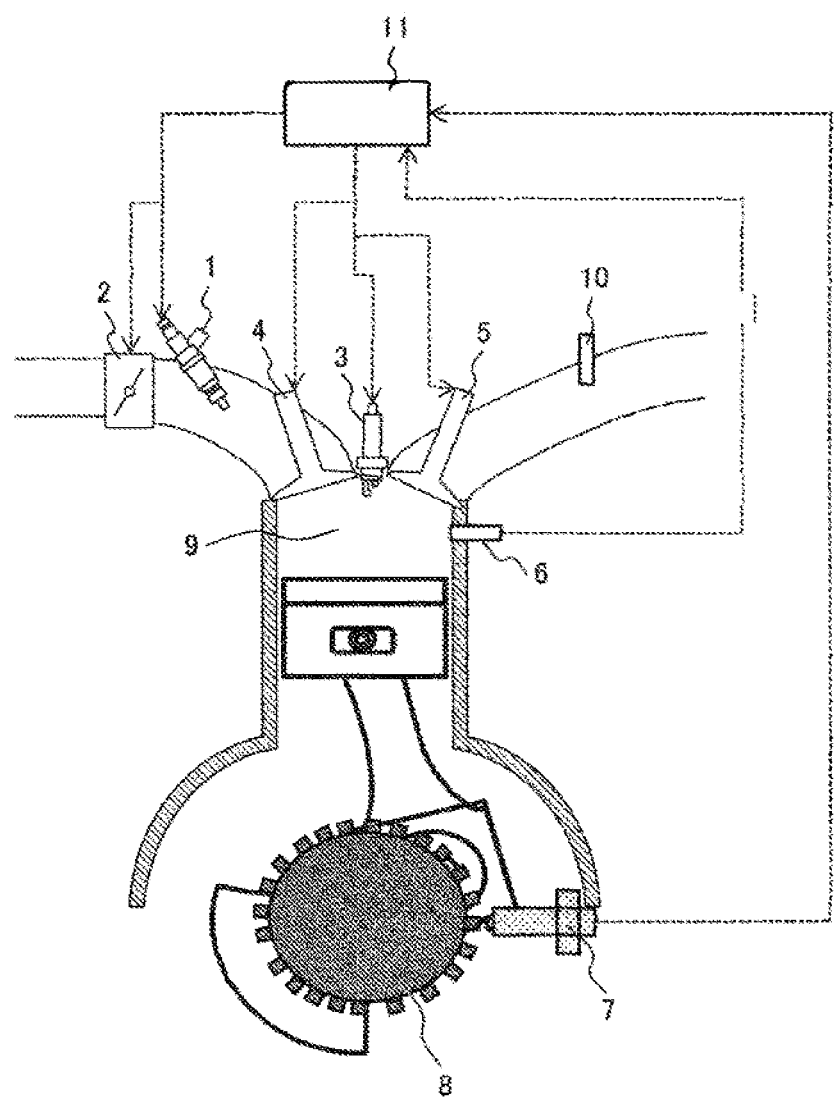
FIG. 3 is a schematic configuration diagram of an internal combustion engine (engine) according to an embodiment of the invention.

Next, a control device and a control method of the internal combustion engine according to the first embodiment will be described with reference to FIGS. 3 to 7. FIG. 3 is a diagram for explaining a schematic configuration of the engine system (internal combustion engine) of this embodiment. As illustrated in FIG. 3, the present engine system is a spark ignition engine including an ignition plug 3 that ignites an air-fuel mixture of fuel and air in a combustion chamber 9. Fuel is injected into an intake pipe for introducing air into the combustion chamber 9 by an injector 1. Further, the amount of air supplied to the engine (combustion chamber 9) is adjusted by a throttle 2. The amount of air entering the engine (combustion chamber 9) is measured by a sensor, a computer (controller 11) calculates a required fuel, and the fuel is injected at high pressure into the intake pipe by the injector 1.

The combustion chamber 9 is provided with a combustion pressure estimation sensor 6 for detecting a physical quantity having a correlation with the combustion pressure. The combustion pressure estimation sensor 6 includes, for example, a pressure sensor that detects the pressure in the combustion chamber 9, a strain sensor that detects the amount of strain (strain amount) on the wall surface of the combustion chamber 9, a vibration sensor that detects vibration associated with combustion, an acceleration sensor, a sound sensor that detects a sound generated in the combustion chamber 9, and a current meter that measures ion current generated associated with combustion.

A crank angle sensor (rotation sensor) 7 for detecting a rotation position (crank angle) of a crankshaft 8 is installed in the engine, and the output of a combustion pressure estimation sensor 6 and the rotation angle of the crank can be synchronized by using the crank angle sensor (rotation sensor) 7.

An $O_2$ sensor 10 is installed in the exhaust pipe after the merging of the cylinders. The $O_2$ sensor 10 measures the $O_2$ concentration in the exhaust gas and estimates the overall excess air ratio.

An intake valve 4 and an exhaust valve 5 are installed on the intake side and the exhaust side of the combustion chamber 9, respectively, and these valves are mounted with a variable valve mechanism which can change any one of a phase timing (opening/closing timing) and a lift amount (opening degree).

The controller 11 has a control function and a drive function of reading the values of the combustion pressure estimation sensor 6 and the crank angle sensor (rotation sensor) 7, and based on these values, controlling the injection amount and injection timing of the injector 1, the opening of the throttle 2, the ignition timing of the ignition plug 3, a variable amount of the intake valve 4, and a variable amount of the exhaust valve 5.

Figure 4:
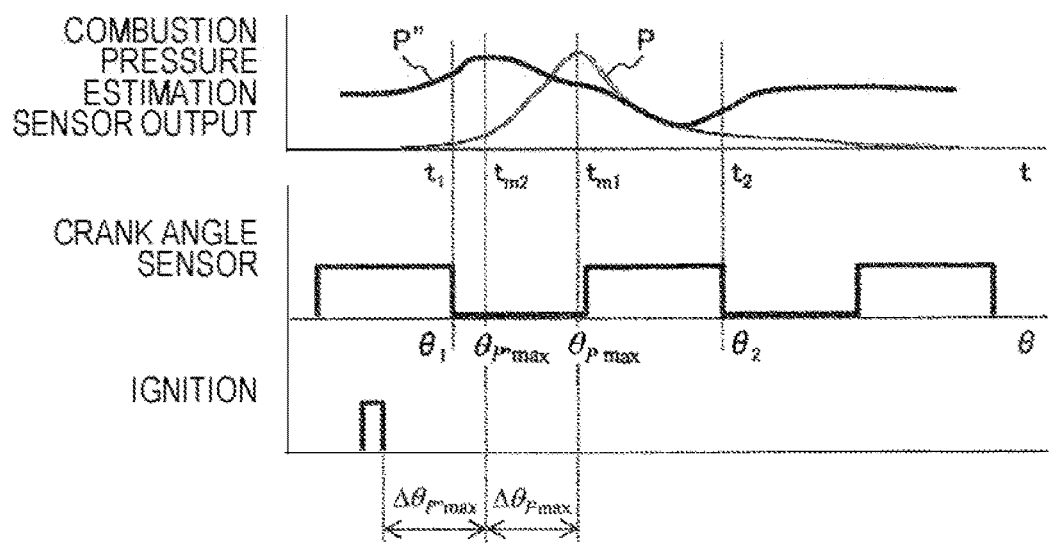
FIG. 4 is a timing chart illustrating a transition of a sensor output value according to an embodiment of the invention.

FIG. 4 illustrates timings ($\Delta\theta_{Pmax}$, $\Delta\theta_{P''max}$) defined from the output values of the combustion pressure estimation sensor 6 and the crank angle sensor (rotation sensor) 7. The timings ($\Delta\theta_{Pmax}$, $\Delta\theta_{P''max}$) are the crank angle ($\Delta\theta_{Pmax}$) that is the maximum value of the combustion pressure estimation sensor 6, and the crank angle ($\Delta\theta_{P''max}$) that is the maximum value of the second derivative of the combustion pressure estimation sensor 6.

$\Delta\theta_{P''max}$ is an ignition delay period from the ignition timing of the ignition plug 3 to the combustion start timing in the combustion chamber 9, and $\Delta\theta_{Pmax}$ is a combustion period from the combustion start timing to the set amount combustion end timing at which the set amount (predetermined) combustion ends.

Formulas for calculating each parameter are defined as the following Formulas (1) and (2).

[Math. 1]

$$\theta_{Pmax} = \frac{t_{m1} - t_1}{t_2 - t_1}\theta_2 + \frac{t_2 - t_{m1}}{t_2 - t_1}\theta_1 \quad (1)$$

[Math. 2]

$$\theta_{P''max} = \frac{t_{m2} - t_1}{t_2 - t_1}\theta_2 + \frac{t_2 - t_{m2}}{t_2 - t_1}\theta_1 \quad (2)$$

Here, $t_1$ and $t_2$ are the falling timings (time base) of the crank angle sensor, $t_{m1}$ is the timing (time base) indicating the maximum value (P) of the combustion pressure estimation sensor 6, and $t_{m2}$ is the timing (time base) indicating the maximum value of the second derivative (P'') of the combustion pressure estimation sensor 6.

Further, $\theta_1$ and $\theta_2$ indicate the falling timing (crank angle base) of the crank angle sensor 7.

By the Expressions (1) and (2), even when the falling cycle of the crank angle sensor 7 is relatively rough, for example, every 10 deg (the cycle is long), accurate $\theta_{Pmax}$ and $\theta_{P''max}$ can be calculated. From $\theta_{Pmax}$ and $\theta_{P''max}$, $\Delta\theta_{Pmax}$ and $\Delta\theta_{P''max}$ are calculated and utilized for combustion control. Further, $\Delta\theta_{Pmax}$ is a crank period from the time of ignition to the maximum value of the value (P) of the combustion pressure estimation sensor 6, and $\Delta\theta_{P''max}$ is defined as a crank period from ignition to the maximum value of the value (P'') of the second derivative of the combustion pressure estimation sensor 6.

$\Delta\theta_{Pmax}$ indicates a correlation with the combustion period from ignition to the center of gravity of combustion, and $\Delta\theta_{P''max}$ indicates a correlation with the ignition delay period from ignition to the start of heat generation. Therefore, the combustion conditions can be easily estimated by combining these two pieces of data.

Since $\Delta\theta_{Pmax}$ and $\Delta\theta_{P''max}$ do not require the accuracy of the absolute value of the output of the combustion pressure estimation sensor 6, an accurate measurement can be made even if, for example, temperature drift of the output value of the pressure sensor or deterioration of the sensor occurs. Further, a sensor that measures engine vibration, thermal distortion (strain) of the head, combustion noise, and the like can be used as a combustion pressure estimation sensor. In other words, it can be said that combustion control by low-cost combustion detection can be realized by utilizing the defined timings ($\Delta\theta_{Pmax}$, $\Delta\theta_{P''max}$).

Figure 5:
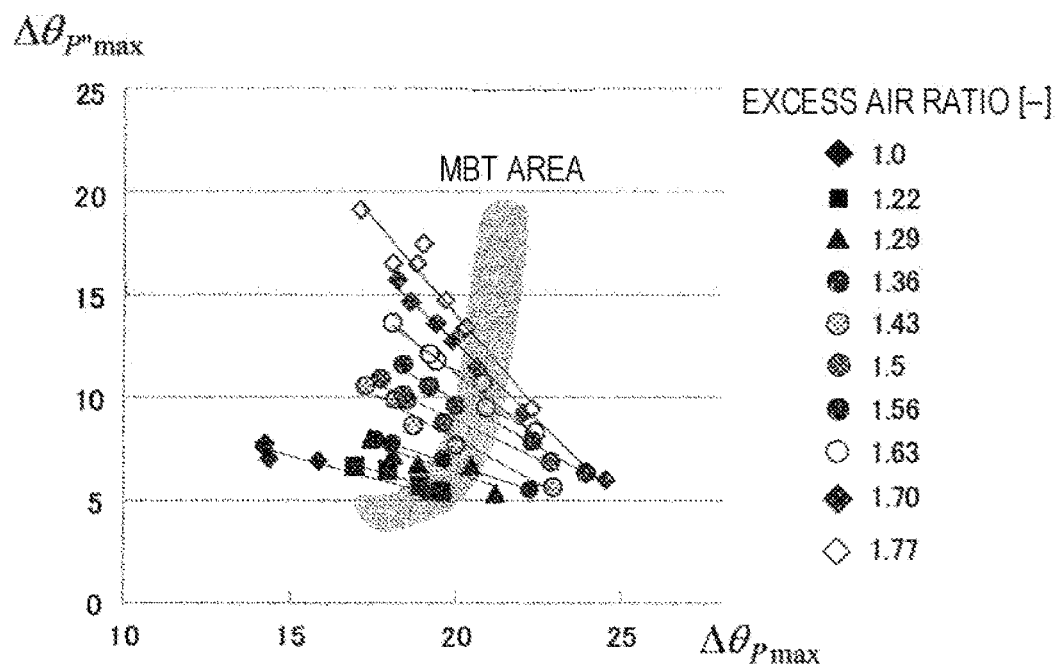
FIG. 5 is a diagram illustrating a relation between an excess air ratio and an MBT area.

FIG. 5 illustrates the results of arranging the timings ($\Delta\theta_{Pmax}$, $\Delta\theta_{P''max}$) calculated from the combustion pressure estimation sensor 6 of the actual engine for each combustion condition. The combustion conditions change the excess air ratio λ and the ignition timing, respectively.

From these results, $\Delta\theta_{Pmax}$ and $\Delta\theta_{P''max}$ illustrate a linear correlation for each excess air ratio λ. Further, it can be seen that the maximum torque ignition timing (MBT: Minimum Advance for Best Torque) at each λ has a region of $\Delta\theta_{Pmax}$ and $\Delta\theta_{P''max}$. From these facts, it is possible to control both λ and MBT simultaneously by utilizing $\Delta\theta_{Pmax}$ and $\Delta\theta_{P''max}$.

Next, a specific control procedure (method) of the internal combustion engine in this embodiment will be described using FIGS. 6 and 7. Here, an example of the control procedure when the target excess air ratio λ is set to 2 will be described.

As illustrated in FIG. 7, when the point E serving as the MBT is targeted, the control can be classified into the following areas A, B, C, and D based on $\Delta\theta_{Pmax}$ and $\Delta\theta_{P''max}$ calculated from the output of the combustion pressure estimation sensor 6. (see FIG. 6)

Region A: Current λ is larger than target λ, and current ignition timing is delayed from MBT Region B: Current λ is larger than target λ, and current ignition timing is advanced from MBT Region C: Current λ is smaller than target λ, current ignition timing is delayed from MBT Region D: Current λ is smaller than target λ, and current ignition timing is advanced from MBT The control method in each area when performing MBT and λ control is described below.

Region A: The ignition timing is advanced after λ is reduced. That is, when the ignition delay period is long and the combustion period is long with respect to the set MBT region, the injector 1 and the throttle 2 are controlled so as to be within the set excess air ratio region λ, and then set. Then, the ignition timing of the ignition plug 3 is controlled so as to fall within the MBT region.

Region B: λ is decreased after delaying the ignition timing. That is, when the ignition delay period is long and the combustion period is short with respect to the set MBT region, the ignition timing of the ignition plug 3 is controlled so as to fall within the set MBT region. Then, the injector 1 and the throttle 2 are controlled so as to fall within the set excess air ratio range λ.

Region C: λ is increased after the ignition timing is advanced. That is, when the ignition delay period is overlapped with the set MBT region and the combustion period is long, the ignition timing of the ignition plug 3 is controlled so as to fall within the set MBT region. Then, the injector 1 and the throttle 2 are controlled so as to fall within the set excess air ratio rate range λ.

Region D: λ is increased after delaying the ignition timing. That is, when the ignition delay period is overlapped with the set MBT region and the combustion period is short, the ignition timing of the ignition plug 3 is controlled so as to fall within the set MBT region. Then, the injector 1 and the throttle 2 are controlled so as to fall within the set excess air ratio range λ.

When the current ignition timing is advanced from the MBT as in the regions B and D, the delay of the ignition timing is controlled with priority, because abnormal combustion such as knocking is likely to occur.

On the other hand, when the current λ is larger than the target λ and the current ignition timing is delayed from the MBT as in the region A, the ignition timing is advanced after the control for decreasing λ is performed first. Since the control of λ is determined by the supply amounts of fuel and air, the fluctuation is larger than the ignition timing. Since λ and ignition timing control required in the region A are both controls in which knocking is likely to occur, knocking can be avoided by controlling λ having a large variation factor first.

When the current λ is smaller than the target λ and the current ignition timing is delayed from the MBT as in the region C, the ignition timing is first advanced and then λ is increased. This is because if λ is increased first, the probability of misfire increases, so that it is necessary to give priority to advancement of the ignition timing.

By performing the above control procedure, it is possible to control to the target excess air ratio λ and the maximum torque ignition timing MBT in each of the combustion regions A to D without causing knocking and misfire.

As described above, according to the control device and the control method for the internal combustion engine of this embodiment, the combustion state is classified based on the timings ($\Delta\theta_{Pmax}$, $\Delta\theta_{P''max}$) calculated from the output values of the combustion pressure estimation sensor 6 and the crank angle sensor (rotation sensor) 7. It is possible to stabilize the combustion and suppress the $NO_x$ emissions without increasing the mounting load on the ECU more than necessary by controlling the ignition timing for the excess air ratio λ and the maximum torque ignition timing MBT according to each classification (operation zone). It is possible to control the internal combustion engine with high efficiency.

Second Embodiment

A control device and a control method for an internal combustion engine according to a second embodiment will be described with reference to FIGS. 8 to 13.

Figure 8:
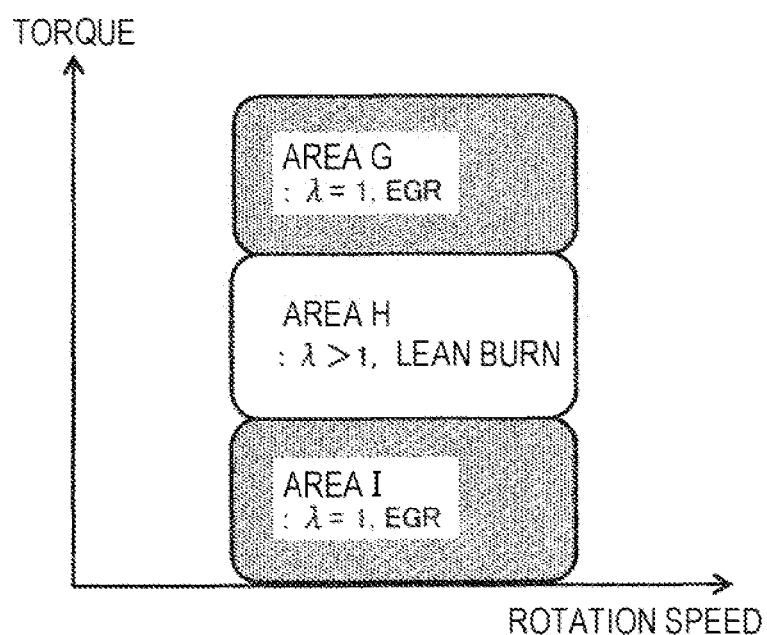
FIG. 8 is a diagram illustrating a relation between a rotation speed and a torque in lean combustion.

In the lean combustion in which the excess air ratio λ is close to 2 as in the first embodiment, it is difficult to achieve a wide rotation speed and a wide torque range because the mountability of auxiliary devices such as a supercharger is restricted. FIG. 8 illustrates the operation zone of lean combustion where the excess air ratio λ is around 2.

At low loads, it is difficult to realize lean combustion due to the low temperature of the air-fuel mixture at the time of ignition. At high loads, auxiliary equipment such as a turbo is required. Therefore, it can be said that the first embodiment for realizing the lean combustion is suitable for operation at a medium load (operation zone (region) H). For this reason, it is necessary to perform combustion using EGR (Exhaust Gas Recirculation) at low load and high load when the excess air ratio λ is 1 (operation zones (regions) G and I). At low loads, pumping loss is reduced by using EGR, and at high loads, efficiency can be improved by using EGR to reduce cooling loss due to lower combustion temperature and improve knocking resistance.

Figure 9:
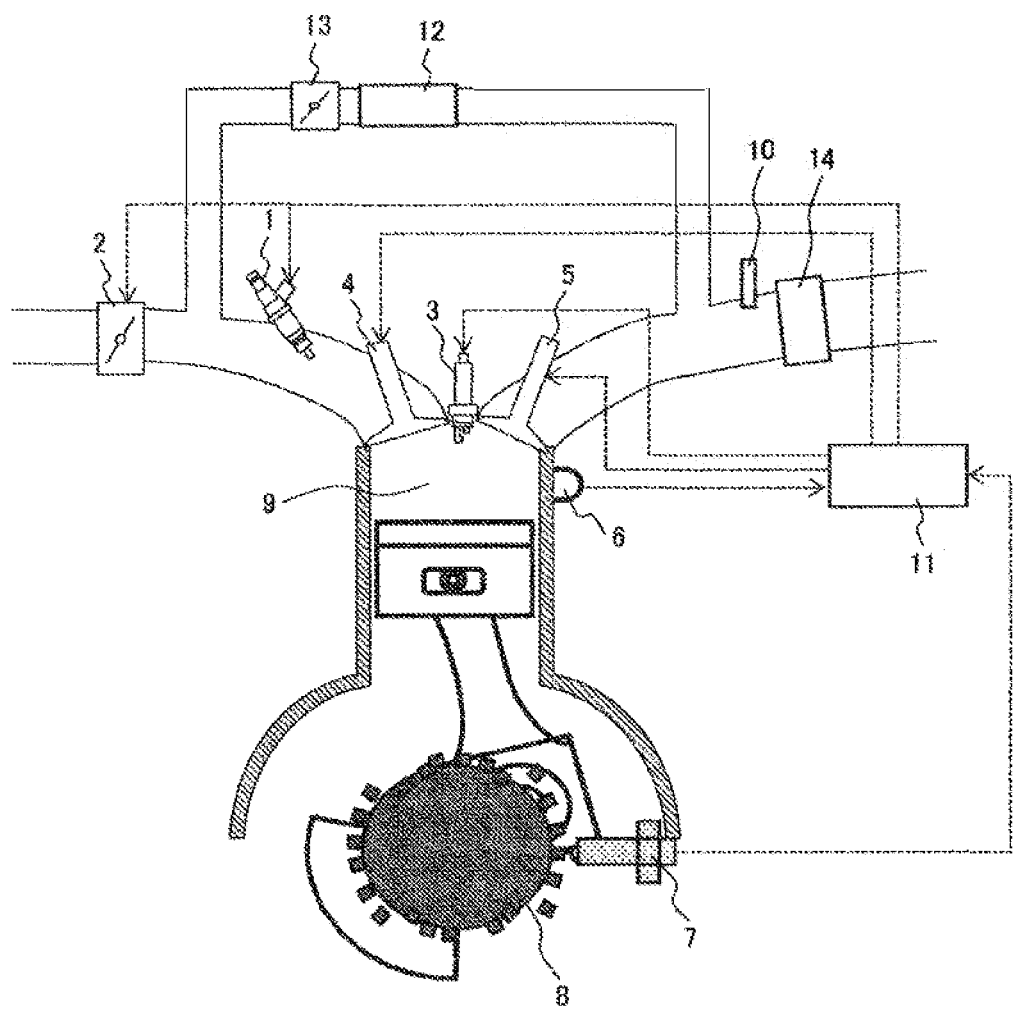
FIG. 9 is a schematic configuration diagram of an internal combustion engine (engine) according to an embodiment of the invention.

FIG. 9 illustrates a schematic configuration of an engine system (internal combustion engine) of this embodiment for supplying EGR.

As illustrated in FIG. 9, the engine system (internal combustion engine) of this embodiment is configured to have an EGR system in which part of the exhaust gas of the engine is connected to the intake pipe of the engine. The exhaust gas of the engine is supplied to an intake pipe of the engine through an EGR cooler 12 and an EGR valve 13.

Engine cooling water is supplied to the EGR cooler 12, and the EGR is cooled to about 80° C. or lower (not illustrated). With such a configuration, the cooled EGR can be supplied to the engine in an arbitrary amount.

The system of this embodiment is a system in which the excess air ratio λ is 1 and the EGR is controlled to an arbitrary amount. Since the three-way catalyst 14 is provided in the exhaust pipe, unburned fuel and $NO_x$ are purified by the three-way catalyst and are converted into water vapor, $CO_2$, and $N_2$. Although it is difficult to directly control the flow rate of the EGR amount because the temperature and the exhaust gas component are unstable, the use of the combustion control system of this embodiment enables accurate control of the EGR amount and the MBT.

In addition, the EGR rate (exhaust gas recirculation rate) decreases as the torque increases in both the operation zones (regions) I and G.

In the operation zone (region) I, the control is performed such that the EGR rate increases as the load decreases in order to reduce the pumping loss. Further, in the operation zone (region) G, the intake air amount increases as the torque increases due to a high load, and the EGR rate decreases. The EGR rate also changes with the intake air temperature. From the above, it is important to control the EGR rate optimally and perform the MBT operation in order to operate efficiently in the operation zones (regions) G and I.

Figure 10:
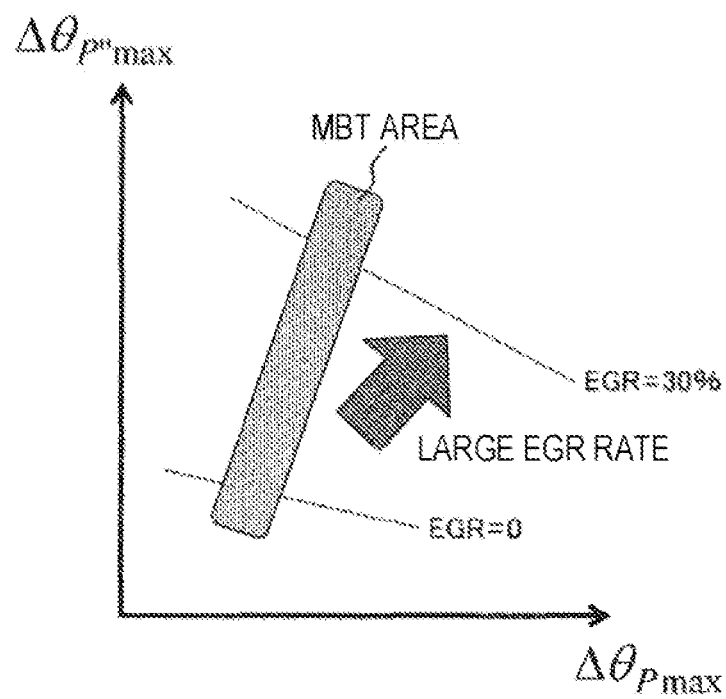
FIG. 10 is a diagram illustrating a relation between an EGR rate and an MBT area.

In the EGR system, when the ignition timing is changed, it can be arranged by $\Delta\theta_{Pmax}$ and $\Delta\theta_{P''max}$ illustrated in FIG. 10. The EGR rate is defined as in the following Formula (3).

[Math. 3]

$$\text{EGR rate} = (\text{EGR amount})/(\text{intake air flow rate} + \text{EGR amount}) \quad (3)$$

In the internal combustion engine (engine system) of this embodiment illustrated in FIG. 9, the ratio of the EGR amount to the sum of the intake air flow rate (new air flow rate) taken in from the outside via the throttle 2 and the EGR amount returned from the exhaust side to the intake side via the EGR cooler 12 and the EGR valve 13 becomes the EGR rate.

When the EGR rate increases, the proportion of inert $CO_2$ and water vapor in the gas sucked into the engine (combustion chamber 9) increases, and the combustion tends to be slow. Therefore, in the case of the same ignition timing, $\Delta\theta_{Pmax}$ and $\Delta\theta_{P''max}$ increase as the EGR rate increases. When the ignition timing is changed, if the ignition timing is changed at each EGR rate as illustrated in FIG. 10, $\Delta\theta_{Pmax}$ and $\Delta\theta_{P''max}$ show a linear relation. Further, since a predetermined MBT region exists at each EGR rate, it is possible to control the EGR rate and the MBT simultaneously.

Figure 11:
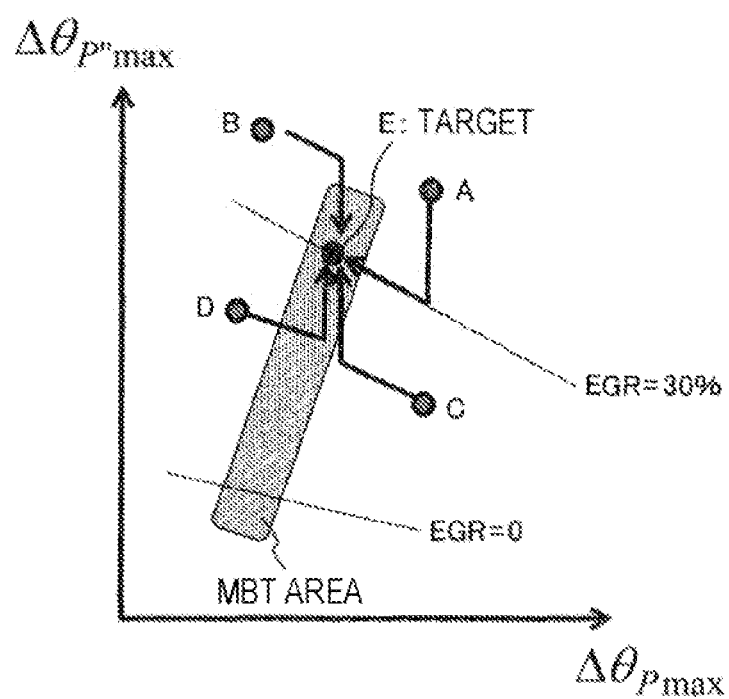
FIG. 11 is a diagram conceptually illustrating a control method of an internal combustion engine (engine) according to an embodiment of the invention.

In the operation zone (region) I, a specific control method for actively controlling the EGR rate is illustrated in FIGS. 11 and 12. The following areas A, B, C and D can be classified based on $\Delta\theta_{Pmax}$ and $\Delta\theta_{P''max}$ calculated from the output of the combustion pressure estimation sensor 6. (see FIG. 12)

Region A: Current EGR is greater than target EGR, and current ignition timing is delayed from MBT Region B: Current EGR is larger than target EGR, and current ignition timing is advanced from MBT Region C: The current EGR is smaller than the target EGR, and the current ignition timing is delayed from MBT Region D: Current EGR is smaller than target EGR, and current ignition timing is advanced from MBT The control method in each area when performing MBT and EGR control is described below.

Region A: The ignition timing is advanced after reducing the EGR rate.

Region B: The EGR rate is reduced after the ignition timing is delayed.

Region C: The EGR rate is increased after the ignition timing is advanced.

Region D: The EGR rate is increased after the ignition timing is delayed.

When the current ignition timing is advanced from the MBT as in the regions B and D, the delay of the ignition timing is controlled with priority, because abnormal combustion such as knocking is likely to occur.

On the other hand, when the current EGR is larger than the target EGR and the current ignition timing is delayed from the MBT as in the region A, the ignition timing is advanced after the control for reducing the EGR rate is performed first. Since the control of the EGR rate is determined by the supply amounts of fuel and air, the fluctuation is larger than the ignition timing. Since the EGR rate and ignition timing control required in the region A are both controls in which knocking is likely to occur, knocking can be avoided by controlling the EGR rate having a large variation factor first.

When the current EGR is smaller than the target EGR and the current ignition timing is delayed from the MBT as in the region C, the ignition timing is first advanced and then the EGR rate is increased. This is because if the EGR rate is increased first, the probability of misfire increases, so that it is necessary to give priority to advancement of the ignition timing.

By performing the above control procedure, it is possible to control to the target EGR rate (exhaust gas recirculation rate) and the maximum torque ignition timing MBT in each of the combustion regions A to D without causing knocking and misfire.

In the operation zone (region) G of FIG. 8, since the EGR rate is determined depending on the intake air amount due to the operation under a high load, it is difficult to control. Therefore, as illustrated in FIG. 13, the ignition timing is controlled, and the control is performed in the MBT region for each EGR rate. Specifically, the ignition timing is delayed in the region K, and the ignition timing is advanced in the region J, so that the ignition timing is controlled to be within the MBT region.

As described above, according to the control device and the control method for the internal combustion engine of this embodiment, the combustion state is classified based on the timings ($\Delta\theta_{Pmax}$, $\Delta\theta_{P''max}$) calculated from the output values of the combustion pressure estimation sensor 6 and the crank angle sensor (rotation sensor) 7. It is possible to stabilize the combustion and suppress the $NO_x$ emissions without increasing the mounting load on the ECU more than necessary by controlling the ignition timing for the EGR rate (exhaust gas recirculation rate) and the maximum torque ignition timing MBT according to each classification (operation zone). It is possible to control the internal combustion engine with high efficiency.

Third Embodiment

Figure 14:
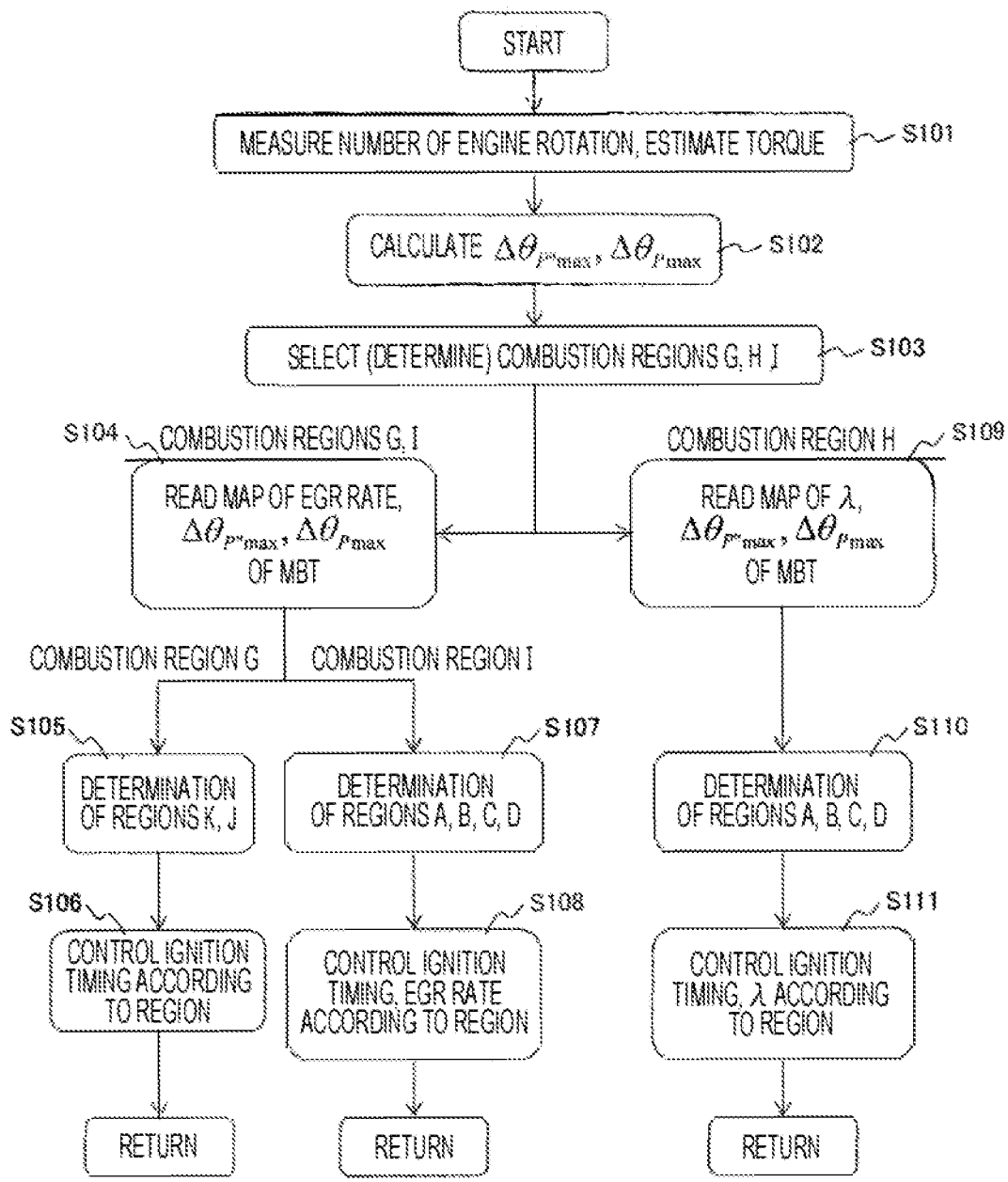
FIG. 14 is a flowchart illustrating a control method of an internal combustion engine (engine) according to an embodiment of the invention.

A control method for an internal combustion engine according to a third embodiment will be described with reference to FIG. 14. FIG. 14 is a flowchart illustrating a control method for each combustion zone (region) illustrated in FIG. 8.

First, in Step S101, the rotation speed of the engine is measured, and the torque is estimated. The rotation speed is measured by a rotation sensor (crank angle sensor) 7 of the crankshaft 8. The torque is estimated from any of the intake air amount, fuel amount, thermal efficiency, and accelerator opening.

Next, in Step S102, $\Delta\theta_{Pmax}$ and $\Delta\theta_{P''max}$ are calculated based on the measurement values of the combustion pressure estimation sensor 6.

Thereafter, in Step S103, the combustion zone (region) determination illustrated in FIG. 8 is performed. When the combustion zone (region) is G or I, since the combustion is an EGR rate control with the excess air ratio $\lambda=1$, the map of the EGR rate with $\Delta\theta_{Pmax}$ and $\Delta\theta_{P''max}$ as axes and the MBT is read in Step S104 (see FIG. 10). This map is determined for each engine rotation speed and torque. When the combustion zone (region) is G, after determining the regions K and J illustrated in FIG. 13 in Step S105, the ignition timing control according to the region is performed in Step S106. When the combustion zone (region) is I, any one of regions A, B, C, and D is determined in Step S107 (see FIG. 11), and the ignition timing and the EGR rate are controlled according to the region in Step S108 (see FIG. 12).

On the other hand, if it is determined in Step S103 that it is the combustion zone (region) H. Since the region is a lean combustion with an excess air ratio $\lambda=1.8$ or more, so in Step S109, the map of the excess air ratio $\lambda$ with $\Delta\theta_{Pmax}$ and $\Delta\theta_{P''max}$ as axes and the MBT is read (see FIG. 7). Subsequently, in Step S110, the determination of the regions A, B, C, and D is performed (see FIG. 7), and in Step S111, the ignition timing and the excess air ratio $\lambda$ are controlled according to the region. (see FIG. 6)

As described above, according to the control method for the internal combustion engine of this embodiment, the combustion state is classified based on the timings ($\Delta\theta_{Pmax}$, $\Delta\theta_{P''max}$) calculated from the output values of the combustion pressure estimation sensor 6 and the crank angle sensor (rotation sensor) 7. It is possible to stabilize the combustion and suppress the $NO_x$ emissions without increasing the mounting load on the ECU more than necessary by controlling the excess air ratio $\lambda$ and the maximum torque ignition timing MBT, or the ignition timing for the EGR rate (exhaust gas recirculation rate) and the maximum torque ignition timing MBT according to each classification (operation zone). It is possible to control the internal combustion engine with high efficiency.

The presence or absence of the control according to each embodiment described above can be confirmed, for example, by an output signal (waveform) from the ECU (Engine Control Unit) of an automobile equipped with the internal combustion engine (engine) and the presence/absence of installation of a sensor (combustion pressure estimation sensor) to the combustion chamber.

In addition, the invention is not limited to the above embodiments, but various modifications may be contained.

For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

REFERENCE SIGNS LIST 1 injector
2 throttle
3 ignition plug
4 intake valve
5 exhaust valve
6 combustion pressure estimation sensor
7 rotation sensor (crank angle sensor)
8 crankshaft
9 combustion chamber
10 $O_2$ (concentration) sensor
11 controller 12 EGR cooler
13 EGR valve
14 three-way catalyst

The invention claimed is:

1. A control device of an internal combustion engine for controlling the internal combustion engine, comprising:
an ignition plug that ignites an air-fuel mixture of fuel and air in a combustion chamber;
a combustion pressure estimation sensor that detects a combustion pressure in the combustion chamber; and
a crank angle sensor that detects a crank angle of a crankshaft, wherein
the control device includes
a first calculating means that calculate $\theta_{Pmax}$ which is the crank angle that is the maximum value of the combustion pressure estimation sensor, and $\theta_{P''max}$ which is the crank angle that is the maximum value of the double derivative of the combustion pressure estimation sensor, and
a second calculating means that calculate $\Delta\theta_{Pmax}$ which is the period from the ignition timing by the ignition plug to the $\theta_{Pmax}$, and $\Delta\theta_{P''max}$ which is the period from the ignition timing by the ignition plug to the $\theta_{P''max}$, wherein
an MBT region is set based on the $\Delta\theta_{Pmax}$ and the $\Delta\theta_{P''max}$,
an ignition timing of the ignition plug is controlled so as to fall within the set MBT region,
the internal combustion engine further includes:
a throttle that controls an amount of air supplied to the combustion chamber; and
an injector that injects fuel into an intake pipe that introduces air into the combustion chamber,
an excess air ratio region is set based on the ignition delay period and the combustion period, and
the throttle and the injector are controlled so as to fall within the set excess air ratio region, wherein
the ignition delay period is calculated from a crank angle from an ignition timing of the ignition plug until a second derivative value of a detection value of the combustion pressure estimation sensor reaches a maximum value.

2. The control device of the internal combustion engine according to claim 1, wherein the combustion period is calculated from a crank angle from the combustion start timing until a detection value of the combustion pressure estimation sensor reaches a maximum value.

3. The control device of the internal combustion engine according to claim 1, wherein, when the ignition delay period is long and the combustion period is long with respect to the set MBT region, an ignition timing of the ignition plug is controlled so as to fall within the set MBT region after the throttle and the injector are controlled so as to fall within the set excess air ratio region.

4. The control device of the internal combustion engine according to claim 1, wherein, when the ignition delay period is long and the combustion period is short with respect to the set MBT region, the throttle and the injector are controlled so as to fall within the excess air ratio region after an ignition timing of the ignition plug is controlled so as to fall within the set MBT region.

5. The control device of the internal combustion engine according to claim 1, wherein, when the ignition delay period is overlapped with the set MBT region and the combustion period is long, an ignition timing of the ignition plug is controlled so as to fall within the set MBT region, and the throttle and the injector are controlled so as to fall within the excess air ratio region.

6. The control device of the internal combustion engine according to claim 1, wherein, when the ignition delay period is overlapped with the set MBT region and the combustion period is short, an ignition timing of the ignition plug is controlled so as to fall within the set MBT region, and the throttle and the injector are controlled so as to fall within the excess air ratio region.

7. The control device of the internal combustion engine according to claim 1, wherein
the internal combustion engine further includes an EGR system that returns a part of exhaust gas discharged from the combustion chamber into the intake pipe,
an EGR rate region is set based on the ignition delay period and the combustion period, and
the throttle and the injector are controlled so as to fall within the set EGR rate region.

8. The control device of the internal combustion engine according to claim 1, wherein the combustion pressure estimation sensor is any one of a pressure sensor that detects a pressure in the combustion chamber, a vibration sensor that detects a vibration of the combustion chamber, an acceleration sensor that detects a vibration of the combustion chamber, a sound sensor that detects a sound generated by the combustion chamber, a strain sensor that detects a strain generated on a wall of the combustion chamber, and a current meter that measures an ion current generated by combustion.

9. A control method of an internal combustion engine, comprising:
(a) measuring a rotation number of a crankshaft in the internal combustion engine, and estimating a torque of the internal combustion engine from any of an intake air amount, a fuel amount, a thermal efficiency, and an accelerator opening;
(b) measuring a combustion pressure in a combustion chamber of the internal combustion engine, and calculating an ignition delay period from an ignition timing of an ignition plug to a combustion start timing, and a combustion period from the combustion start timing to a set amount combustion end timing which a set amount of combustion ends, based on the measured combustion pressure in the combustion chamber and the rotation speed of the crankshaft measured in the step (a);
(c) calculating, using a first calculating means, $\theta_{Pmax}$ which is the crank angle that is the maximum value of the combustion pressure estimation sensor, and $\theta_{P''max}$ which is the crank angle that is the maximum value of the double derivative of the combustion pressure estimation sensor, and
(d) calculating, using a second calculating means, $\Delta\theta_{Pmax}$ which is the period from the ignition timing by the ignition plug to the $\theta_{Pmax}$, and $\Delta\theta_{P''max}$ which is the period from the ignition timing by the ignition plug to the $\theta_{P''max}$,
(e) setting an MBT region based on the $\Delta\theta_{Pmax}$ and the $\Delta\theta_{P''max}$, wherein
the ignition timing of the ignition plug is controlled so as to fall within the MBT region set in the step (e),
the internal combustion engine further includes:
a throttle that controls an amount of air supplied to the combustion chamber; and
an injector that injects fuel into an intake pipe that introduces air into the combustion chamber, wherein an excess air ratio region is set based on the ignition delay period and the combustion period, the throttle and the injector are controlled so as to fall within the set excess air ratio region, and the ignition delay period is calculated from a crank angle from an ignition timing of the ignition plug until a second derivative value of a detection value of the combustion pressure estimation sensor reaches a maximum value.

10. The control method of the internal combustion engine according to claim 9, further comprising:

(f) determining a combustion zone based on the rotation speed of a crankshaft and the estimated torque measured in the step (a), wherein an ignition timing of the ignition plug is controlled according to a combustion range determined in the step (f).

\* \* \* \* \*